US012712259B2

(12) United States Patent
Quitt

(10) Patent No.: US 12,712,259 B2
(45) Date of Patent: Aug. 18, 2026

(54) CONNECTION ASSEMBLY FOR A RADIATOR HEAD

(71) Applicant: Telefonaktiebolaget LM Ericsson (publ), Stockholm (SE)

(72) Inventor: Markus Quitt, Rohrdorf (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 165 days.

(21) Appl. No.: 18/718,058

(22) PCT Filed: Dec. 22, 2021

(86) PCT No.: PCT/EP2021/087436
§ 371 (c)(1), (2) Date: Jun. 9, 2024

(87) PCT Pub. No.: WO2023/117098
PCT Pub. Date: Jun. 29, 2023

(65) Prior Publication Data
US 2025/0046984 A1 Feb. 6, 2025

(51) Int. Cl.
*H01Q 1/24* (2006.01)
*H01Q 21/00* (2006.01)
*H01Q 21/26* (2006.01)

(52) U.S. Cl.
CPC ......... *H01Q 1/246* (2013.01); *H01Q 21/0006* (2013.01); *H01Q 21/26* (2013.01)

(58) Field of Classification Search
CPC ..... H01Q 1/246; H01Q 21/0006; H01Q 21/26
See application file for complete search history.

(56) References Cited

U.S. PATENT DOCUMENTS 4,924,236 A * 5/1990 Schuss ................. H01Q 9/0442 343/859
5,523,728 A * 6/1996 McCorkle ................. H01P 5/10 333/128
6,067,053 A 5/2000 Runyon et al.
8,872,715 B2 10/2014 Lea et al.
9,711,871 B2 7/2017 Jones
10,629,997 B2 4/2020 Doudou et al.
11,201,406 B2 12/2021 Tang et al.
(Continued)

OTHER PUBLICATIONS

International Search Report and Written Opinion received for PCT/EP2021/087436 dated on Aug. 5, 2022.

*Primary Examiner* — Hai V Tran
(74) *Attorney, Agent, or Firm* — Sonoda & Kobayashi Intellectual Property Law; Sarvajit S. Patil

(57) ABSTRACT

A connection assembly for a radiator head of an antenna comprises a connector and a feeding structure. The feeding structure comprises a substrate, at least one ground conductor and at least one signal conductor, wherein the substrate comprises at least one mating section. The connector comprises at least one receptacle for receiving the at least one mating section of the substrate, and at least one source connection region. In the source connection region, a conductor and a shielding for the conductor is provided, the conductor being the signal conductor of the feeding structure or a conductor galvanically connected to the signal conductor of the feeding structure. Further, an antenna and a mobile communication cell site is provided.

17 Claims, 7 Drawing Sheets

(56) References Cited

U.S. PATENT DOCUMENTS

| | | | | |
|---|---|---|---|---|
| 2008/0024374 | A1* | 1/2008 | Cornwell | H01Q 9/0421 343/703 |
| 2012/0244874 | A1* | 9/2012 | Behairy | H04W 4/021 455/422.1 |
| 2015/0070234 | A1 | 3/2015 | Jones | |
| 2016/0365641 | A1 | 12/2016 | Mayer et al. | |
| 2017/0125917 | A1* | 5/2017 | Lin | H01Q 9/16 |
| 2018/0269589 | A1 | 9/2018 | Xu et al. | |
| 2021/0376481 | A1* | 12/2021 | Zhang | H01Q 21/062 |

* cited by examiner

CONNECTION ASSEMBLY FOR A RADIATOR HEAD

CROSS-REFERENCE TO RELATED APPLICATIONS

This patent application is a submission under 35 U.S.C. § 371 for U.S. national stage patent application of international application no. PCT/EP2021/087436 filed on Dec. 22, 2021 and entitled "CONNECTION ASSEMBLY FOR A RADIATOR HEAD," the entirety of which is incorporated herein by reference.

TECHNICAL FIELD

The invention relates to a connection assembly for a radiator head, an antenna as well as a mobile communication cell site.

BACKGROUND

In antenna arrays, a plurality of radiator heads have to be arranged and fixed to a reflector in a precise and reliable way. In particular, the quality of the electrical connection is important, meaning that no adverse electrical effects, like passive intermodulation should occur. At the same time, the number of radiators that should be arranged in a given area increases as antenna arrays for different frequency ranges are interleaved with one another. This development leads to limited space available to provide the electrical connection and the mechanical support.

To this end, feeding structures comprising a PCB are known, for example from U.S. Pat. No. 8,872,715 B2 or U.S. Pat. No. 9,711,871 B2. However, the mechanical stability as well as the signal quality due to adverse effects remain problematic. Especially problematic are cladding waves or surface waves that are generated by an ill-defined grounding of the PCB to the reflector.

SUMMARY

Thus, it is an object of the invention to provide a connection assembly for a radiator head of an antenna having an improved signal quality and a high mechanical stability. In particular, cladding waves or surface waves shall be prevented.

For this purpose, a connection assembly for a radiator head of an antenna is provided. The connection assembly has a connector and a feeding structure, the feeding structure comprising a substrate, at least one ground conductor and at least one signal conductor, wherein the substrate comprises at least one mating section. The connector comprises at least one receptacle for receiving the at least one mating section of the substrate, and at least one source connection region. In the source connection region, a conductor and a shielding for the conductor is provided, the conductor being the signal conductor of the feeding structure or a conductor galvanically connected to the signal conductor of the feeding structure.

By providing a receptacle for receiving the substrate and a source connection region having a shielding for a conductor, a high connection quality without adverse electrical effects is ensured, while a high mechanical stability is achieved. Further, the construction ensures that no leakage of currents as surface waves or cladding waves occurs as the grounding of the substrate is well defined by the use of the receptacle.

The substrate may comprise a coupling section for the radiator head, in particular at its top end.

In particular, the source connection regions and the receptacles are located on different sides of a plate-shaped middle section of the connector.

For example, the at least one mating section is formed complimentary to the receptacle, so that the mechanical stability is further improved.

The feeding structure may have the same number of mating sections as the connector has receptacles.

In order to simplify the connector, the substrate may comprise at least one connection protrusion, in particular extending from the at least one mating section, wherein the connection protrusion extends into the source connection region, in particular without physical contact to the connector.

For example, the signal conductor extends onto the connection protrusion and/or the ground conductor ends before reaching the lower end of the signal conductor, in particular before reaching the connection protrusion. Thus, there is no need to provide dedicated conductors on the connector.

In an embodiment, the connector comprises at least one hollow cylindrical section defining the source connection region, further improving the quality of the shielding.

For example, each hollow cylindrical section defines a single one of the source connection regions. Preferably, the coaxial cable will be soldered to the connection region.

The source connection region may be a coaxial cable and/or a mount for a coaxial cable or for a socket for such a cable, simplifying the assembly of the antenna.

In an aspect, the connector has a body made of conducting material or comprising a conductive coating, wherein the body provides the shielding for the conductor in the source connection region, in particular wherein the connector is made of a single piece. This simplifies the manufacturing of the connector further.

The material of the body may be aluminum or zinc. The body and thus the whole connector may be manufactured by die-casting, in particular high-pressure die-casting.

Alternatively, the body may be made of plastic, for example by injection molding, and an applied metallic coating.

In an embodiment, the connector comprises a cavity connecting the receptacle and the source connection region, in particular wherein the receptacle and the source connection region are located on different sides of the connector.

For example, each one of the source connection regions is connected via a cavity with one of the receptacles.

For further improved signal quality, the signal conductor is provided on one of the surfaces of the substrate and the ground conductor is provided on the other surface of the substrate, in particular wherein the ground conductor and the signal conductor form a microstrip transmission line.

For example, the substrate of the feeding structure is a dielectric material, in particular a PCB.

In an embodiment, the receptacle has the form of a slot with two opposing sidewalls, wherein the width of the slot corresponds to the thickness of the substrate and/or the shape of the slot corresponds to the cross section of the substrate. This way, a high degree of mechanical stability is ensured.

In particular, the width of the slot may correspond to the thickness of the substrate either when the width of the slot is equal to the thickness of the substrate or when the width of the slot is equal to the thickness of the substrate plus the size of a small gap for soldering the substrate to the connector.

It is conceivable that the shape of the slot has a geometry different from the cross section of the substrate, while being large enough to receive the cross section of the substrate.

In order to reliably avoid accidental ground connections of the signal conductor, one of the sidewalls is associated with the signal conductor, and the sidewall associated with the signal conductor comprises a groove at the location of the signal conductor.

For example, one of the sidewalls is associated with the ground conductor, and the sidewall associated with the ground conductor is electrically connected with the shielding, in particular galvanically or capacitively. This way, a reliable ground connection without passive intermodulation is achieved.

The galvanic connecting may be achieved by soldering.

In an embodiment, the connector comprises four receptacles and the feeding structure comprises two substrates forming a cross shaped cross section, in particular being perpendicular to one another. This way, a very compact and mechanically stable setup is achieved.

For example, wherein each substrate comprises at least one signal conductor and a ground conductor, each providing the conductors necessary for feeding one dipole.

For the ease of manufacture, one of the substrates may comprise a slit extending from the top end face downwards and the other one of the substrates may comprise a slit extending from the bottom end face upwards.

For example, the slits have a width corresponding to the thickness of the other substrate.

In an embodiment, the connector comprises at least one connection element, in particular a hook and/or a screw hole for attaching the connector to a reflector, providing a very robust mechanical support for the connector on the reflector.

For above mentioned purpose, further an antenna is provided, in particular for a mobile communication cell site. The antenna provides a reflector, a radiator head and a connection assembly as described above, wherein the radiator head is attached to the feeding structure and the connector is attached to the reflector, in particular wherein the shielding of the connector is electrically, particularly galvanically connected to the reflector.

The features and advantages of the connection assembly also apply to the antenna and vice versa.

The reflector may be fixed and/or grounded to the reflector using a screw.

For example, the antenna comprises a plurality of radiator heads supported by a feeding structure each. The feeding structures may then be connected to a feeding network that distributes signals to and from the radiator heads to a transceiver (source). The feeding network comprises, for example, coaxial cables or other conductors connected to the feeding structure via the source connection region.

To decrease adverse influences, the receptacles may be arranged above the reflector and/or the source connection region may be arranged below the reflector.

In an embodiment, the antenna comprises a non-conductive layer located between the top side of the reflector and parts of the connector, thus preventing passive intermodulation.

Further for above mentioned purpose, a mobile communication cell site is provided comprising an antenna as described above.

BRIEF DESCRIPTION OF THE DRAWINGS

Further features and advantages will be apparent from the following description as well as the accompanying drawings, to which reference is made. In the drawings.

DETAILED DESCRIPTION

Figure 1:
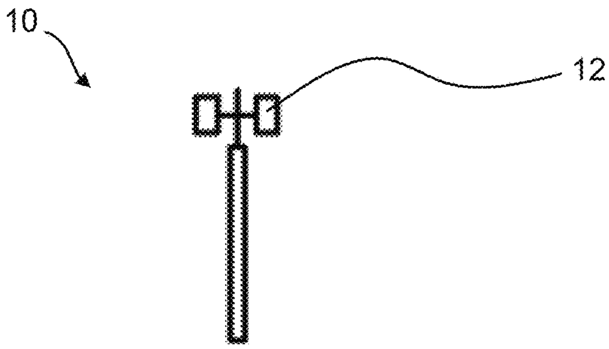
FIG. 1: shows schematically a mobile communication cell site according to the invention with an antenna according to the invention.

FIG. 1 shows a mobile communication a cell site 10 schematically. The cell site 10 has two antennas 12.

Figure 2:
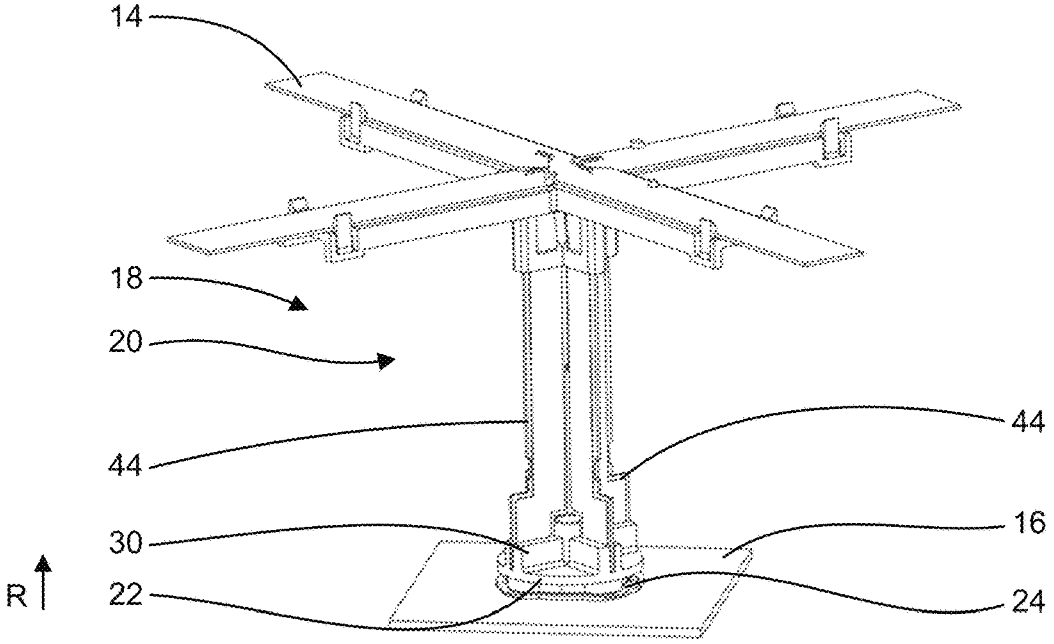
FIG. 2: shows perspectively a radiator of the antenna according to FIG. 1 with a connection assembly according to the invention mounted on a reflector.

FIG. 2 shows schematically a part of one of the antennas 12, namely a radiator head 14, an associated reflector 16 and a connection assembly 18 that supports the radiator head 14 above the reflector 16.

The connection assembly 18 comprises a feeding structure 20, a connector 22 and a non-conductive layer 24.

The connector 22 extends through the reflector 16 and provides a support for the feeding structure 20.

The feeding structure 20, in turn, supports and connects the radiator head 14.

The non-conductive layer 24 is optional and it is arranged between the top side of the reflector 16 and the connector 22 in order to avoid passive intermodulation effects.

Without such non-conductive layer 24, an electrically optimized galvanic contact between the reflector 16 and the connector 22 is realized by means of a defined press contact area at the bottom side of the connector 22.

The terms “top”, “bottom”, “up”, “down”, “above”, “below”, or the like are used with reference to the radiation direction R of the antenna 12 and the radiator head 14 in the drawings for ease of understanding, but not to restrict the orientation of the antenna 12 when mounted in the cell site 10.

The radiation direction R is substantially perpendicular to the reflector 16.

Figure 3:
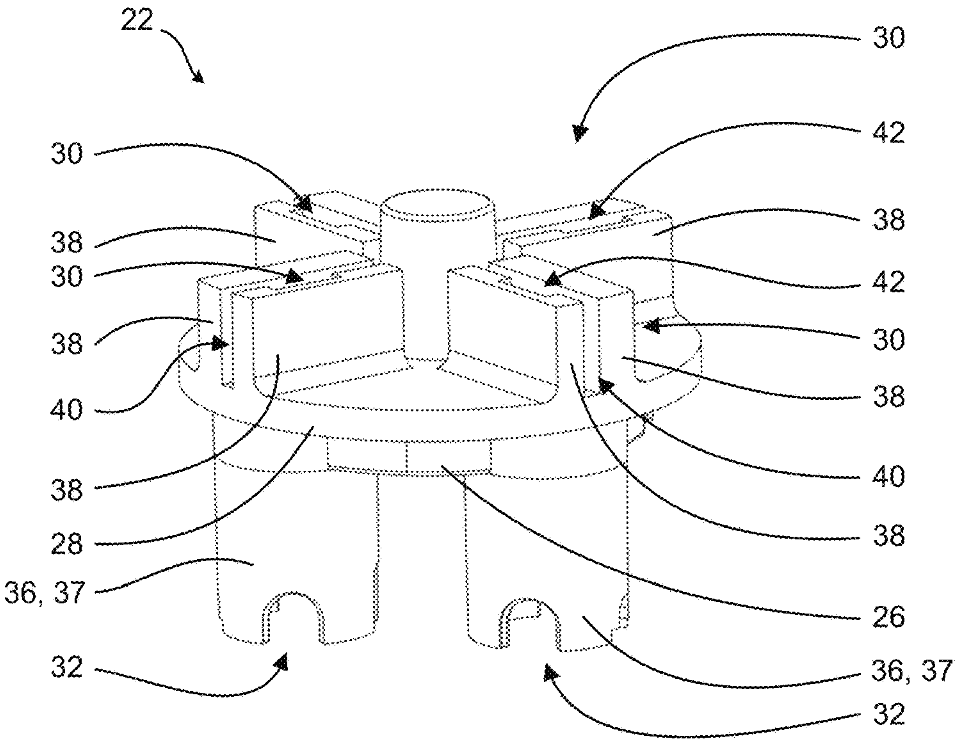
FIG. 3: shows a connector of the connection assembly of FIG. 2, FIG. 4: shows an exploded view of a feeding structure of the connection assembly of FIG. 2, FIGS. 5, 6: show an exploded view of the connection assembly of FIG. 2 in a partly unassembled state in a front view and a back view, respectively.

FIG. 3 shows the connector 22 separately in a detailed perspective view.

The connector 22 is made of a single piece, i.e. it is a monolithic body 26.

The connector 22 and thus the monolithic body 26 is made of metal, for example aluminum or zinc. It may be manufactured by die-casting, in particular high-pressure die-casting.

It is also conceivable that the body 26 is made of a plastic material, for example by injection molding, which is then covered with a metallization layer.

Figure 7:
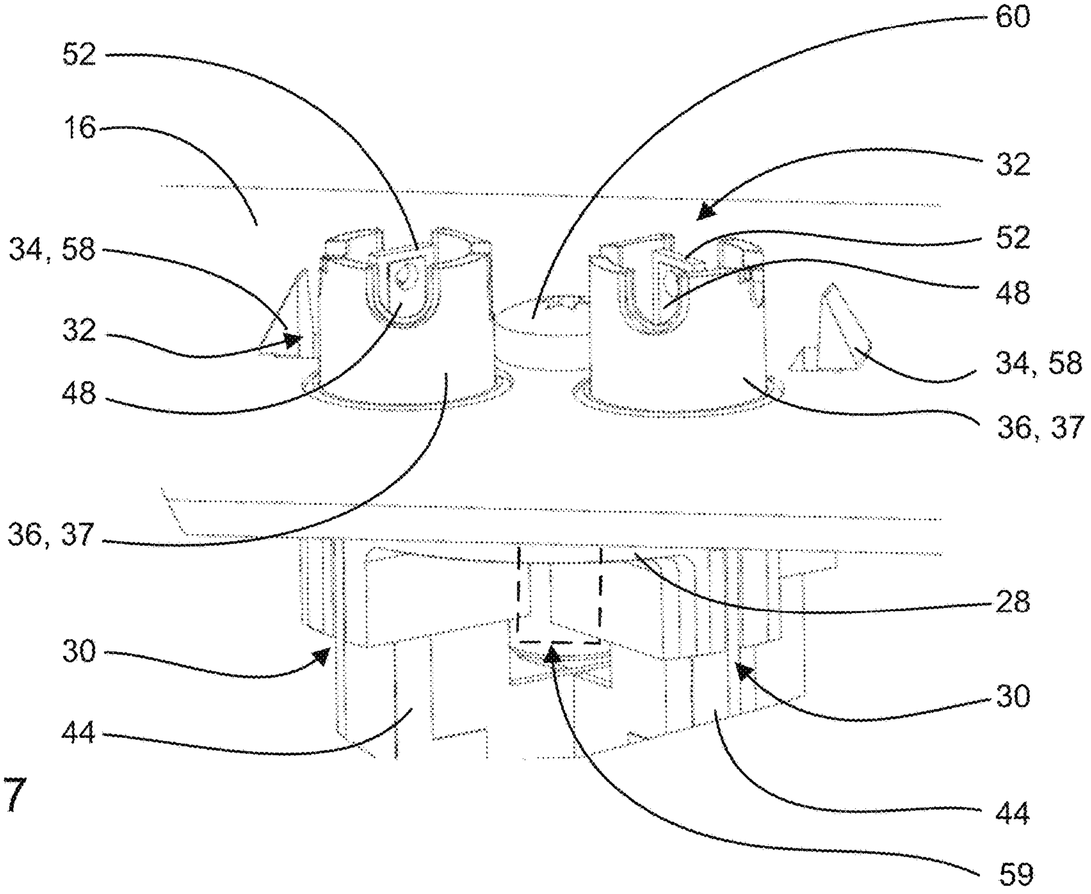
FIG. 7: shows a bottom view of the reflector with protruding parts of the connector of FIG. 2, FIG. 8: shows a schematic view of the antenna according to FIG. 1 having feeding network.

In the shown embodiment, the connector 22 and thus the monolithic body 26 has a plate-shaped middle section 28, a plurality of receptacles 30, a plurality of source connection regions 32 and a plurality of connection elements 34 (FIG. 7).

In the center of the middle section 28, one of the connection elements 34 is provided, for example as a screw hole.

In the shown embodiment, the connector 22 comprises four receptacles 30 located above the middle section 28 and two source connection regions 32 located below the middle section 28.

For each source connection region 32, a hollow cylindrical section 36 extends from the middle section 28 downwards. The hollow cylindrical section 36 thus defines the source connection region 32 and provides a shielding 37.

Each receptacle 30 is defined by two side walls 38 extending upwards from the middle section 28 and forming a slot 40 between them.

The shape of the slot 40 corresponds to the cross-section of the substrate 44.

The slots 40 extend from the center of the middle section 28 radially outwards. The four receptacles 30 are arranged along the periphery of the middle section 28 in an equidistant manner.

The pair of slots 40 that are opposite to one another with respect to the center extend within in the same plane.

In some or all of the receptacles 30, one of the side walls 38 has a groove, extending downwards.

For each of the source connection regions 32, one of the receptacles 30 is provided, meaning that the source connection regions 32 and the respective corresponding receptacle 30 lie directly above and below each other on different sides of the middle section 28.

The slot 40 of the respective receptacle 30 is connected to the inner volume of the hollow cylindrical section 36 of the respective source connection region 32 by a cavity within the connector 22. Thus, an opening through the whole connector 22 at the source connection regions 32 is provided.

In particular, the receptacles 30 associated with one of the source connection regions 32 comprises the groove 42 in one of the side walls 38. The groove 42 extends into the cavity and/or merges with the inner volume of the respective hollow cylindrical section 36.

Figure 4:
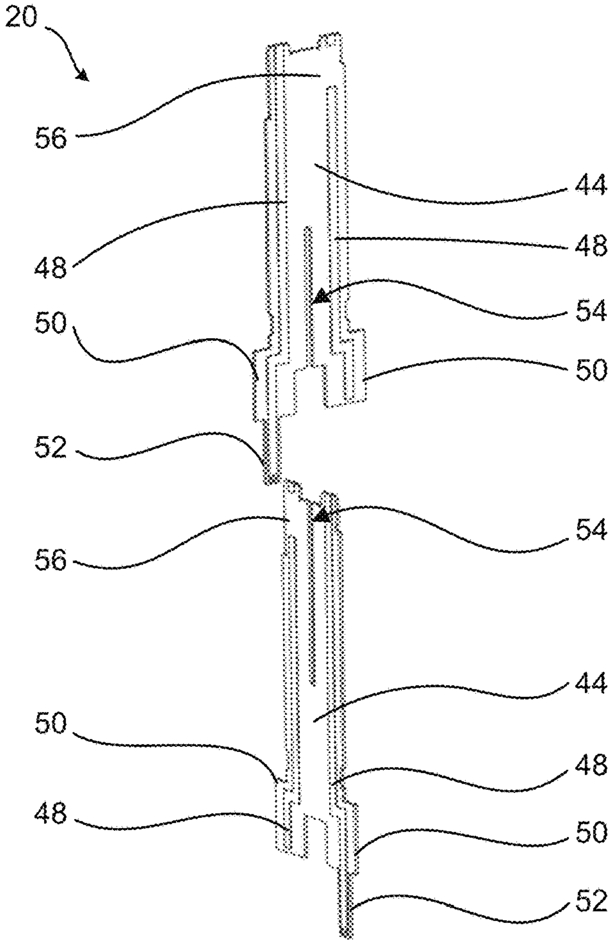

FIG. 4 shows the feeding structure 20 in an exploded view.

The feeding structure 20 comprises two pieces, each having a substrate 44, at least one ground conductor 46 and at least one signal conductor 48.

The substrates 44 are of a dielectric material, in particular a PCB.

The substrates 44 are plate-shaped and have a top end face facing the radiator head 14 as well as a bottom end face facing the reflector 16.

At their top end the substrates 44 have a coupling section 56 for mounting the radiator head 14.

On their bottom end, the substrates 44 comprise two mating sections 50 for insertion into the receptacles 30. The shape and size of the mating sections 50 correspond to the respective receptacle 30, except for the groove 42.

From one of the mating sections 50 of each substrate 44, a connection protrusion 52 extends downwards.

One of the substrates 44, in FIG. 4 the upper one, comprises a slit 54 extending from the lower end face between the mating sections 50 upwards, wherein the other one of the substrate 44, in FIG. 4 the lower one, comprises a slit 54 extending from the top end face downwards. The width of the slits 54 correspond to the thickness of the substrate 44.

The conductors 46, 48 are applied to the surfaces of the substrates 44. The ground conductors 46 are applied to one of the surfaces, whereas the signal conductors 48 are applied to the other one of the surfaces.

In particular, the ground conductors 46 are applied to almost the entire surface of the respective substrate 44 from the mating section 50 upwards until the top end face. Except for the connection protrusion 52, the ground conductor 46 covers the surface of the substrate 44 entirely.

Figure 6:
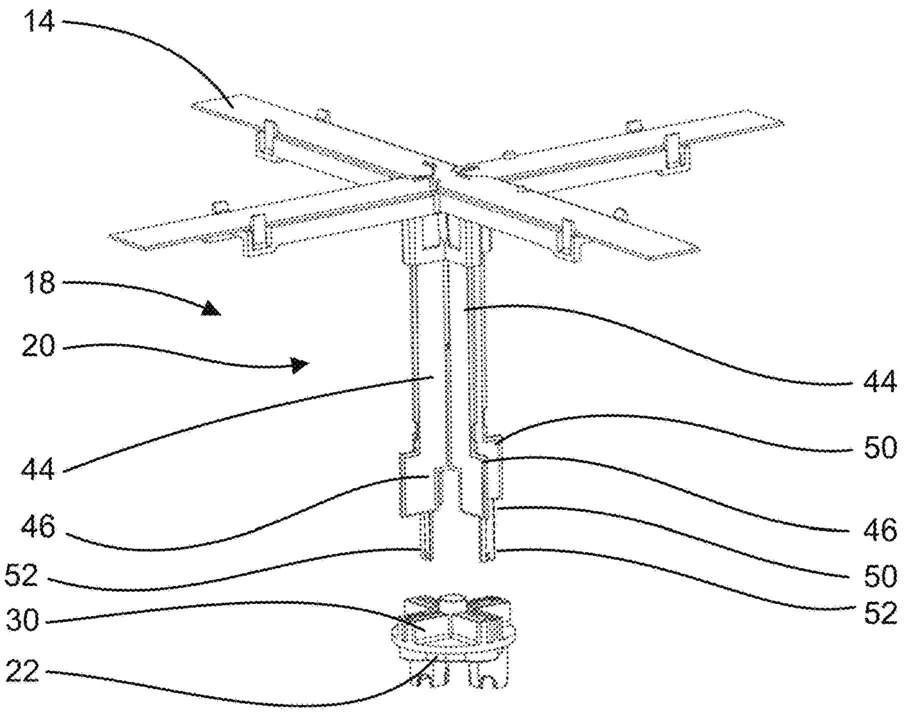

It is also conceivable that the ground conductor 46 also covers the surface of the connection protrusion 52, as indicated with dashed lines in FIG. 6. This leads to an improved transformation between the different line types, e.g. microstrip line type and coaxial type.

The ground conductor 46, the signal conductor 48 and the dielectric media of the substrate 44 form microstrip transmission lines.

In the shown embodiment, each substrate 44 comprises two signal conductors 48. Each one of the signal conductors 48 extends upwards from a different one of the mating sections 50 until the top end face or the coupling section 56 for the radiator head 14. The signal conductors 48 on the same substrate 44 are in particular separate from one another, i.e. not connected.

At the mating section 50 comprising the connection protrusion 52, the signal conductor 48 also extends along the connection protrusion 52, in particular along the full length of the connection protrusion 52.

Figure 5:
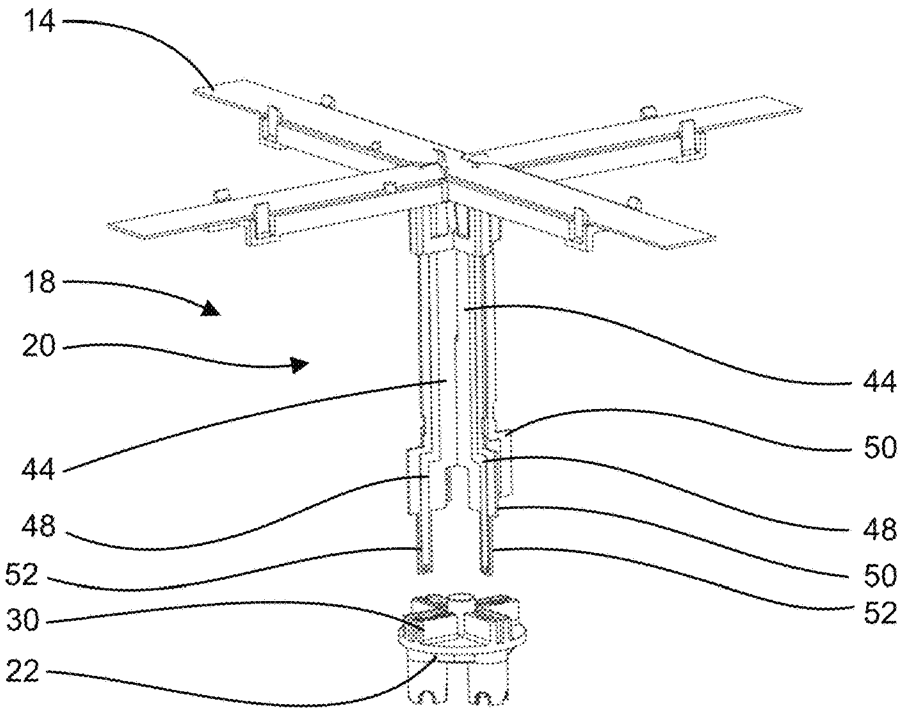

FIGS. 5 and 6 show the connector 22, the connection assembly 18 and the radiator head 14 mounted to the connection assembly 18.

The radiator head 14 is mounted to the coupling section 56 of the respective substrate 44. The radiating structures of the radiator head 14 are connected to the ground conductor 46 and the signal conductor 48 to provide an electrical connection in order to feed signals to the radiator head 14 and receives signals from the radiator head 14.

The connection assembly 18, i.e. the two substrates 44 are in an assembled state, meaning that the two substrates 44 are inserted into one another. More precisely, the substrate 44 having the slit 54 extending from its bottom end face is slit upon the other substrate 44 downwards so that, at first, the two slits 54 overlap and then, when continuing the motion, the slits 54 engage with the respective substrate 44. To this end, the width of the slits 54 correspond to the thickness of the substrate 44.

Once assembled, the substrates 44 are perpendicular to each other, their top and bottom end faces aligned. The feeding structure 20, i.e. the substrate 44 together, have a cross-shaped cross-section.

Thus, the feeding structure 20 has four mating sections 50, two of each substrate 44, equally spaced from one another corresponding to the arrangement of the receptacles 30 on the connector 22.

The assembled feeding structure 20 can then be engaged with the connector 22 by inserting the mating sections 50 into the receptacles 30. To this end, the slots 14 of the receptacles 30 have a width corresponding to the thickness of the substrate 44 at the mating section 50, i.e. the width of the slot 14 being equal to the thickness of the substrate 44 plus, optionally, the size of a small gap for soldering the substrate 44 to the connector 22.

For example, the same number of mating sections 50 as the number of receptacles 30 is provided.

During the insertion, the mating sections 50 are threaded through the receptacles 30 into the hollow cylindrical section 36, i.e. the source connection region 32 from the top side of the connector 22 downwards.

Thus, the signal conductor 48 on the connection protrusions 52 forms the conductor of the source connection region 32. It is also conceivable, that a conductor being separate from the signal conductor 48 is present as an inner conductor in the source connection region 32. This separate conductor may then be galvanically connected to the signal conductor 48 of the feeding structures 20.

Further, besides the electric connection, the slots 40 and thus the receptacles 30 provide a mechanical support for the connection assembly 18 and the radiator head 14. Thus, assembling the antenna 12 is drastically simplified.

To this end, the middle section 28 of the connector 22 is placed on top of the reflector 16 or, if present, onto the non-conductive layer 24. The non-conductive layer 24 may have a disk shape and/or the form of the middle section 28.

The source connection regions 32, in particular the cylindrical sections 36 extend through corresponding openings in the reflector 16 (to the lower side of the reflector 16), whereas the receptacles 30 extend upwards fully above the reflector 16.

FIG. 7 shows a bottom view of the reflector 16 with an engaged connector 22 having the connection assembly 18 fully inserted.

The connector 22 comprises two hooks 58 as connection elements 34 as well as a screw hole 59 in the shown embodiment.

The hooks 58 extend from the middle section 28 through corresponding openings in the reflector 16 and engaged with the reflector 16 on the lower side, thus preventing that the connector 22 can be detached accidentally.

Further, a screw 60 is inserted from the bottom side through the reflector 16 in the screw hole 59 of the connector 22. The screw 60 provides a very reliable ground connection of the connector 22, in particular the shielding 37.

The connection protrusions 52 extend into the hollow cylindrical sections 36 almost until the lower end of the hollow cylindrical sections 36.

Thus, the signal conductors 48 on the connection protrusions 52 function as an inner conductor and the hollow cylindrical sections 36 as an outer conductor or shielding 37. Therefore, the source connection regions 32—in this embodiment—form a coaxial cable or a mount for a coaxial cable or a socket for such a cable.

The grooves 42 in the side walls 38 of the receptacles 30 are arranged correspondingly to the locations of the signal conductors 48 on the substrate 44 which are inserted into the respective receptacle 30. Thus, at the region that the signal conductor 48 is inserted into the slot 40, the groove 42 is provided so that the signal conductor 48 does not have physical contact with the side wall 38 or any other part of the connector 22.

On the other hand, the ground conductor 46 is brought into connection with the side walls 38, either by dimensioning the slot 40 accordingly and or by soldering the ground conductor 46 to the side wall 38 or any other part of the connector 22. Thus, the ground connection of the ground conductor 46 is ensured, in particular a connection with the shielding 37.

It is also conceivable, that the ground conductor 46 is coupled to the connector 22 capacitively.

By means of the connector 22, the microstrip type transmission line present at the substrate 44 is transformed into a coaxial type transmission line at the source connection regions 32.

The source connection regions 32 may then be connected to a feeding network or a transceiver providing signals for and receiving signals from the radiator head 14.

Using the connection assembly 18, a very reliable electrical connection without passive intermodulation or other adverse electrical effects is provided. At the same time, the connection assembly 18 provides a robust mechanical support and reduces the space needed for mounting and feeding the radiator head 14, while simplifying the assembly process.

Figure 8:
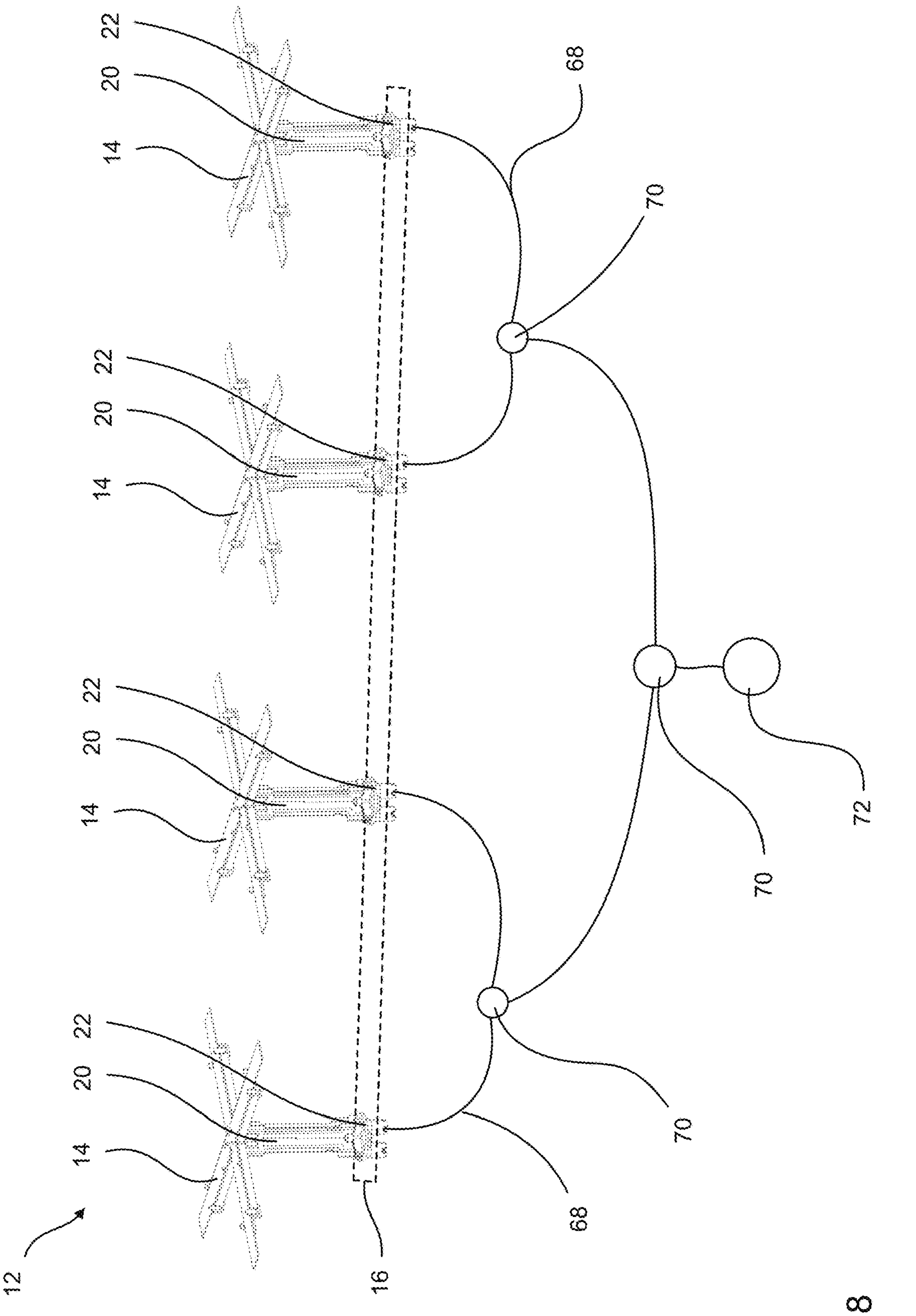

FIG. 8 shows an antenna 12 with a plurality of radiator heads 14 mounted to a common reflector 16 by a separate feeding structure 20 each.

Parts of the feeding network 66 for one of the polarizations are also shown. The feeding network 66 comprises coaxial cables 68, phase shifters 70 and an optional common transceiver 72. The feeding structure 20 may be regarded as part of the feeding network 66.

The cables 68 are connected to the source connection region 32, in particular by soldering. The cables 68 transmit signals from or to the radiator heads 14 to/from the transceiver 72 via the phase shifters 70.

Figure 9:
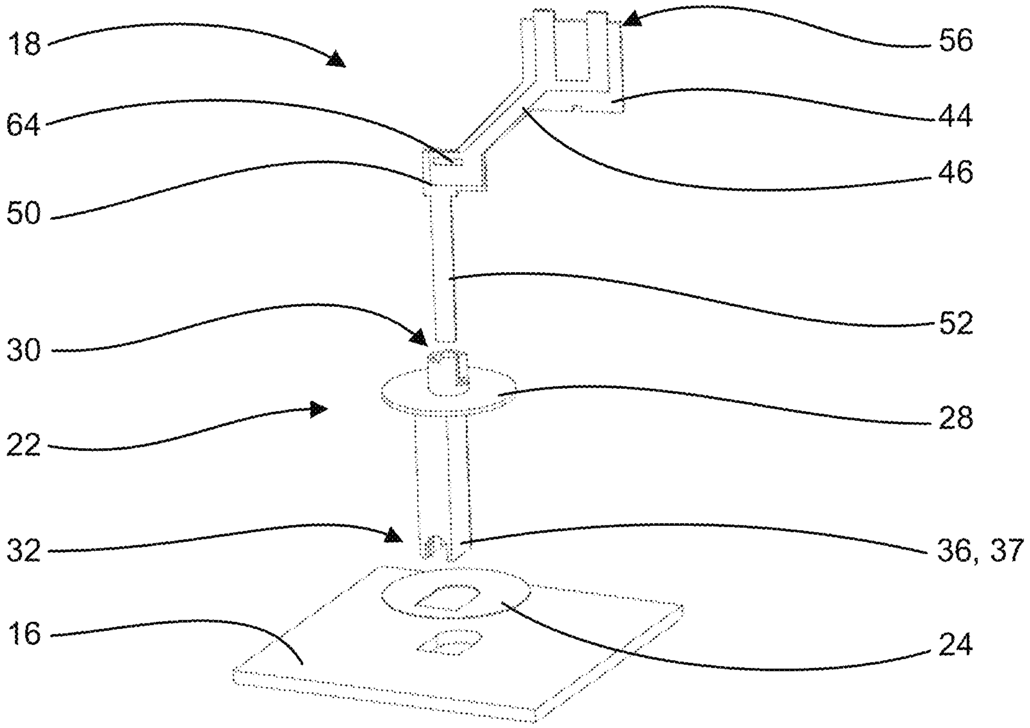
FIG. 9: shows an exploded view of a connection assembly according to a second embodiment of the invention.
Figure 10:
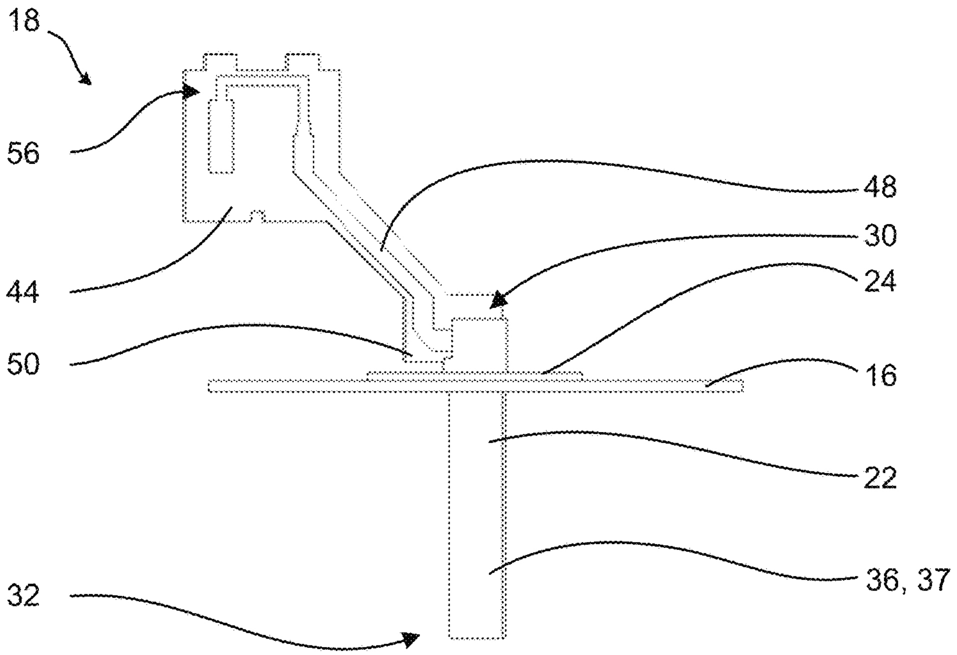
FIG. 10: shows a side view of the connection assembly of FIG. 9, and FIG. 11: shows a cross-sectional view of the connection assembly of FIG. 9.
Figure 11:
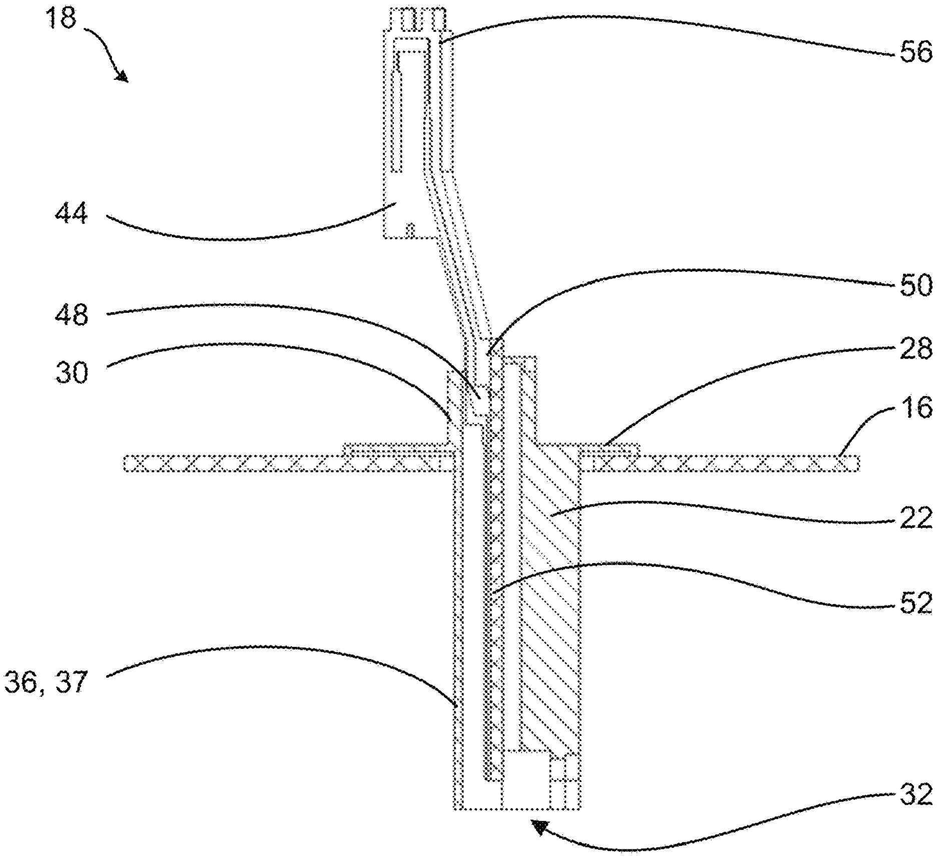

FIG. 9 to 11 show a second embodiment of a connection assembly 18 mounted to a reflector 16. The second embodiment corresponds substantially to the first embodiment so that only the differences are discussed in the following. The same and functionally the same components are labeled with the same reference signs.

In the second embodiment, the feeding structure 20 comprises only a single substrate 44 supporting the ground conductor 46 and the signal conductor 48 on different surfaces.

The substrate 44 is formed as a cantilever in the respect that the coupling section 56 is not arranged directly above the mating section 50 but laterally offset. Further, only one mating section 50 is provided on the substrate 44 as the substrate 44 carries only a single signal conductor 48.

Consequently, the connector 22 comprises only a single receptacle 30.

As can be seen in the cross-section of FIG. 11, the slot 40 of the receptacle 30 is designed such a space is formed on the side of the substrate 44 carrying the signal conductor 48. Thus, physical contact between the signal conductor 48 and the connector 22 is avoided. To this end, the slot 40, the cavity and the hollow cylindrical section 36 are dimensioned appropriately.

On the mating section 50, a contact point 64 is provided, at which the ground conductor 46 is soldered to the receptacle 30 of the connector 22. A capacitive coupling at the contact point 64 is also conceivable.

The invention claimed is:

1. A connection assembly for a radiator head of an antenna, comprising a connector and a feeding structure, the feeding structure comprising a substrate, at least one ground conductor, and at least one signal conductor, wherein the substrate comprises at least one mating section, and the connector comprising at least one receptacle for receiving the at least one mating section of the substrate, and at least one source connection region, wherein in the source connection region a conductor and a shielding for the conductor are provided, the conductor being the signal conductor of the feeding structure or a conductor galvanically connected to the signal conductor of the feeding structure, and wherein the connector comprises a cavity connecting the receptacle and the source connection region, wherein the receptacle and the source connection region are located on different sides of the connector.

2. The connection assembly according to claim 1, wherein the at least one mating section is formed complimentary to the at least one receptacle.

3. The connection assembly according to claim 1, wherein the substrate comprises at least one connection protrusion extending from the at least one mating section, wherein the connection protrusion extends into the source connection region without physical contact to the connector.

4. The connection assembly according to claim 3, wherein the signal conductor extends onto the connection protrusion or the ground conductor ends before reaching the lower end of the signal conductor before reaching the connection protrusion.

5. The connection assembly according to claim 1 wherein the connector comprises at least one hollow cylindrical section defining the source connection region, or wherein the source connection region is configured as a coaxial cable or as a mount for a coaxial cable or for a socket for such a cable.

6. The connection assembly according to claim 1, wherein the connector has a body made of conducting material or comprising a conductive coating, wherein the body provides the shielding for the conductor in the source connection region, in particular wherein the connector is made of a single piece.

7. The connection assembly according to claim 1, wherein the signal conductor is provided on one of the surfaces of the substrate and the ground conductor is provided on the other surface of the substrate, wherein the ground conductor and the signal conductor form a microstrip transmission line.

8. The connection assembly according to claim 1, wherein the receptacle has the form of a slot with two opposing sidewalls, wherein the width of the slot corresponds to the thickness of the substrate or the shape of the slot corresponds to the cross section of the substrate.

9. The connection assembly according to claim 8, wherein one of the sidewalls is associated with the signal conductor, the sidewall associated with the signal conductor comprising a groove at the location of the signal conductor.

10. The connection assembly according to claim 8, wherein one of the sidewalls is associated with the ground conductor, the sidewall associated with the ground conductor being electrically connected with the shielding galvanically or capacitively.

11. The connection assembly according to claim 1, wherein the connector comprises four receptacles and the feeding structure comprises two substrates forming a cross shaped cross section, wherein the two substrates are perpendicular to one another.

12. The connection assembly according to claim 11, wherein each of the substrates comprises a signal conductor and a ground conductor.

13. The connection assembly according to claim 11, wherein one of the substrates comprises a slit extending from a top end face thereof downwards and the other one of the substrates comprises a slit extending from a bottom end face thereof upwards.

14. The connection assembly according to claim 1, wherein the connector comprises at least one connection element comprising a hook or a screw hole for attaching the connector to a reflector.

15. An antenna, in particular for a mobile communication cell site, comprising a reflector, a radiator head and a connection assembly comprising a connector and a feeding structure, wherein the radiator head is attached to the feeding structure and the connector is attached to the reflector, wherein a shielding of the connector is galvanically connected to the reflector, wherein the feeding structure comprises a substrate, at least one ground conductor, and at least one signal conductor, wherein the substrate comprises at least one mating section, wherein the connector comprises at least one receptacle for receiving the at least one mating section of the substrate, and at least one source connection region, wherein in the source connection region a conductor and a shielding for the conductor are provided, the conductor being the signal conductor of the feeding structure or a conductor galvanically connected to the signal conductor of the feeding structure, and wherein the receptacles are arranged above the reflector or the source connection region is arranged below the reflector.

16. The antenna according to claim 15, wherein the antenna comprises a non-conductive layer located between a top side of the reflector and parts of the connector.

17. A mobile communication cell site comprising an antenna comprising a reflector, a radiator head, and a connection assembly comprising a connector and a feeding structure, wherein the radiator head is attached to the feeding structure and the connector is attached to the reflector, wherein a shielding of the connector is galvanically connected to the reflector, wherein the feeding structure comprises a substrate, at least one ground conductor, and at least one signal conductor, wherein the substrate comprises at least one mating section, wherein the connector comprises at least one receptacle for receiving the at least one mating section of the substrate, and at least one source connection region, wherein in the source connection region a conductor and a shielding for the conductor are provided, the conductor being the signal conductor of the feeding structure or a conductor galvanically connected to the signal conductor of the feeding structure, and wherein the receptacles are arranged above the reflector or the source connection region is arranged below the reflector.

* * * * *